Inventors
Frederick Freeman
Herbert Frank Smith
By
Cushman, Darby, Cushman
Attorneys United States Patent Office 3,383,855
Patented May 21, 1968

3,383,855
GAS TURBINE ENGINE
Frederick Freeman, Derby, and Herbert Frank Smith, Allenton, Derby, England, assignors to Rolls-Royce Limited, Derby, England, a British company
Filed June 27, 1966, Ser. No. 560,587
Claims priority, application Great Britain, July 12, 1965, 29,541/65
2 Claims. (Cl. 60—39.65)

ABSTRACT OF THE DISCLOSURE

A gas turbine engine comprises a centrifugal compressor, and axially extending combustion equipment arranged to receive air compressed by the compressor. The combustion equipment has a combustion zone at its downstream end. A radially inward flow turbine is disposed immediately adjacent the centrifugal compressor and is arranged to receive combustion gases from the outlet of the combustion equipment. Substantially all the combustion and dilution air which enters the combustion equipment passes through its radially outer periphery.

---

This invention concerns a gas turbine engine.

According to the present invention, there is provided a gas turbine engine comprising a centrifugal compressor the air compressed by which is supplied to axially extending combustion equipment having a combustion zone at or adjacent the axially downstream end thereof and an outlet disposed at or adjacent the axially upstream end thereof, and a radially inward flow turbine which is disposed immediately adjacent to the centrifugal compressor and which is arranged to receive combustion gases from said outlet, substantially all the combustion and dilution air which enters the combustion equipment passing through the radially outer part of the periphery thereof.

Since substantially all the combustion and dilution air enters the combustion equipment through the radially outer part of its periphery, it is possible to position the radially inner part of the periphery of the combustion equipment closer to the axis of the engine than would otherwise be possible. Moreover, since no, or substantially no, combustion and dilution air is directed to the radially inner part of the periphery, there is a consequent avoidance of the pressure losses which would otherwise be involved in directing such air to the said radially inner part.

The said radially outer part of the combustion equipment is preferably provided with axially spaced sets of apertures through which the combustion equipment may be provided with dilution, secondary, and primary air.

Preferably, the said dilution, secondary and primary air enters the combustion equipment with a component of velocity in a direction towards the combustion zone.

Cooling air which is supplied by the centrifugal compressor enters the combustion equipment through the radially inner and outer parts thereof.

Deflector means are provided internally of the combustion chamber to deflect the cooling air axially along the combustion chamber.

Figure 1:
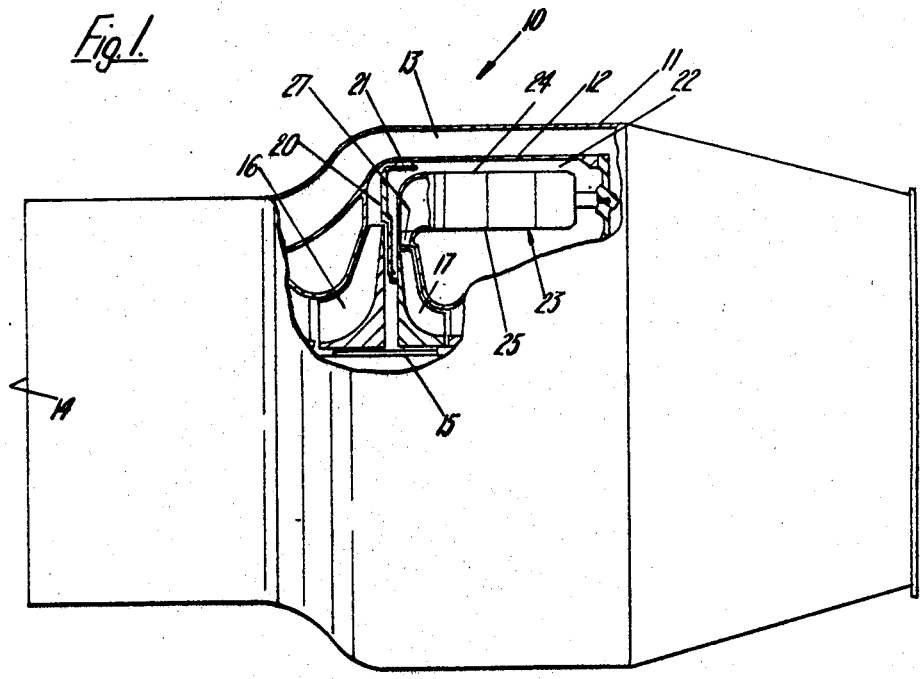
Figure 2:
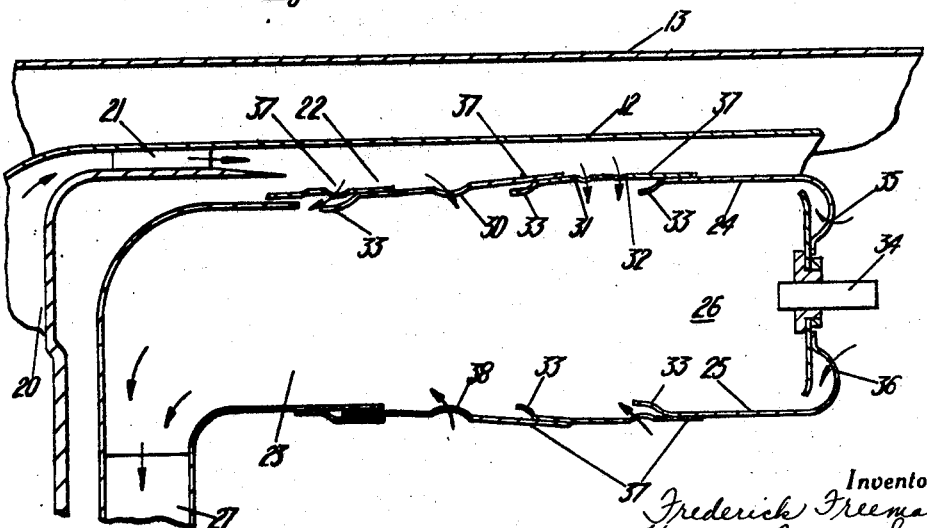

The invention is illustrated, merely by way of example, in the accompanying drawings, in which:

FIGURE 1 is a diagrammatic view, partly in section, of a gas turbine engine according to the present invention, and FIGURE 2 is a broken-away sectional view on a larger scale of part of the combustion equipment of the gas turbine engine of FIGURE 1.

Referring to the drawings, a gas turbine engine 10, has an outer casing 11 and an inner casing 12 which define a by-pass passage 13 which is arranged to receive air from an air inlet 14.

Mounted within the inner casing 12 is a shaft 15 on which are mounted an axial flow compressor, not shown, a centrifugal compressor 16 and a radially inward flow turbine 17 which is disposed immediately adjacent to the centrifugal compressor 16. This mounting of the compressor 16 and turbine 17 immediately adjacent to each other reduces the axial length of the engine.

The air which has been compressed by the centrifugal compressor 16 passes via a passage 20, in which are mounted vanes 21, to a space 22 which is disposed within the inner casing 12 and within which is mounted an axially extending annular combustion chamber 23.

The combustion chamber 23, which has a radially outer wall 24 and a radially inner wall 25, has a combustion zone 26 disposed adjacent the axially downstream end of the combustion chamber 23 and an outlet 27 which is disposed at the axially upstream end of the combustion chamber 23. The turbine 17 is arranged to receive combustion gases from the outlet 27.

The radially outer wall 24 is provided with three axially spaced sets 30, 31, 32, of apertures. Air passing from the space 22 and through the apertures 30 has a component of velocity in the direction of the combustion zone 26, the said air being employed as dilution air, i.e., as air mixed with the combustion gases, so as to reduce the temperature of the latter to a value acceptable to the turbine 17.

The air passing from the space 22 through the apertures 31, 32, also has a component of velocity in the direction of the combustion zone 26. The air which passes through the apertures 32 is employed as primary air, i.e., air used in the initial combustion of the fuel and to effect a reversal or reversals of direction of the combustion gases in the combustion chamber, while the air which passes through the apertures 31 is employed as secondary air, i.e., air used to complete the combustion processes.

Fuel is supplied to the combustion chamber 23 through a number of spaced apart fuel injectors 34.

Some of the air from the space 22 enters the axially downstream end of the combustion chamber 23 through apertures 35, 36 so as to effect film cooling of the inner face of the combustion chamber wall. Moreover, a small proportion of the air from the space 22 flows to the radially inner wall 25 of the combustion chamber and enters the latter through apertures 37, and is deflected axially of the combustion chamber by baffles 33 so as to effect film cooling of the inner face of the radially inner wall 25. Similar apertures 37 and baffles are provided in the radially outer wall 24 to effect film cooling of the inner face of that wall. A further aperture 38 is also provided in the radially inner wall 25 through which air is passed to cool the combustion gases in the vicinity of the junction of the combustion chamber with the outlet 27.

It will thus be appreciated that, apart from the relatively small amount of air employed in cooling the combustion chamber 23, substantially all the air which enters the combustion chamber, whether for supporting combustion or for diluting the combustion gases, enters the combustion chamber through the radially outer wall 24.

If, on the other hand, the combustion and dilution air entered the combustion chamber 23 through both the radially outer wall 24 and the radially inner wall 25, it would be necessary to provide a large space between the radially inner wall 25 and adjacent engine structure so as to allow for the necessary flow of air. Since, however, this provision does not need to be made, it is possible to dispose the radially inner wall 25 closer to the engine axis than would otherwise be possible, whereby to reduce the diameter of the engine.

If, moreover, it were necessary to supply combustion and dilution air to the radially inner wall 25, this air in passing from the space 22 to the radially inner wall 25 would need to be turned twice through a right angle, with consequent pressure losses.

Yet a further advantage of supplying very little air through the radially inner wall 25 is that the air which is supplied therethrough will not interfere with the flows of primary and secondary air and produce unstable flow patterns which impair combustion performance.

We claim:

1. A gas turbine engine comprising a centrifugal compressor, axially extending combustion equipment spaced radially inwardly from an inner casing of the engine so as to receive air compressed by the compressor, the combustion equipment having a first end which is remote from said compressor and a second end which is proximal to the compressor, and including a combustion zone adjacent the first end thereof and an outlet disposed adjacent the second end thereof, and a radially inward flow turbine which is disposed immediately adjacent to the centrifugal compressor and which is arranged to receive combustion gases from said outlet at the second end of the combustion equipment, means for directing substantially all combustion and dilution air through the radially outwardly situated part of the periphery of the combustion equipment and for directing all the said combustion air entering the combustion equipment with a component of velocity in the direction of the combustion zone adjacent said first end of the combustion equipment, said combustion and dilution air being received into said outwardly situated part of the combustion equipment without any flow reversals of the air in its passage through an unrestricted space between said inner casing of the engine and the combustion equipment.

2. An engine as claimed in claim 1 wherein said means for directing combustion and dilution air into the combustion equipment comprises a plurality of air admission apertures through said radially outwardly situated part of the combustion equipment, with a number of said apertures being provided at intervals with deflector means to deflect cooling air axially of the combustion equipment, and including a lesser number of apertures and deflectors through a radially inwardly situated part of said combustion equipment so that only a small proportion of air from the compressor enters the radially inwardly situated part of the combustion equipment.

References Cited

UNITED STATES PATENTS

| | | | |
|---|---|---|---|
| 2,821,607 | 1/1958 | Hill | 60—39.75 |
| 2,895,295 | 7/1959 | Carlson | 60—39.14 X |
| 3,064,424 | 11/1962 | Tomlinson | 60—39.65 |

JULIUS E. WEST, *Primary Examiner.*